United States Patent
Drewes et al.

(10) Patent No.: US 10,422,711 B2
(45) Date of Patent: Sep. 24, 2019

(54) PRESSURE SENSOR

(71) Applicant: Endress + Hauser GmbH + Co. KG, Maulburg (DE)

(72) Inventors: Ulfert Drewes, Mullheim (DE); Andreas Rossberg, Bad Sackingen (DE)

(73) Assignee: ENDRESS+HAUSER SE+CO.KG, Maulberg (DE)

( * ) Notice: Subject to any disclaimer, the term of this patent is extended or adjusted under 35 U.S.C. 154(b) by 217 days.

(21) Appl. No.: 15/559,855

(22) PCT Filed: Feb. 15, 2016

(86) PCT No.: PCT/EP2016/053129
§ 371 (c)(1),
(2) Date: Sep. 20, 2017

(87) PCT Pub. No.: WO2016/150619
PCT Pub. Date: Sep. 29, 2016

(65) Prior Publication Data
US 2018/0058964 A1    Mar. 1, 2018

(30) Foreign Application Priority Data
Mar. 24, 2015    (DE) .................. 10 2015 104 365

(51) Int. Cl.
*G01L 9/00* (2006.01)
*G01L 19/14* (2006.01)

(52) U.S. Cl.
CPC .......... *G01L 9/0075* (2013.01); *G01L 9/0048* (2013.01); *G01L 19/146* (2013.01)

(58) Field of Classification Search
CPC ....... G01L 9/00; G01L 9/0048; G01L 9/0075; G01L 19/00; G01L 19/14; G01L 19/146
See application file for complete search history.

(56) References Cited

U.S. PATENT DOCUMENTS 4,757,708 A    7/1988    Hietaranta
5,824,909 A    10/1998    Kathan et al.
(Continued)

FOREIGN PATENT DOCUMENTS

CN    1829905 A    9/2006
CN    102009663 A    4/2011
(Continued)

OTHER PUBLICATIONS

Chinese Office Action in corresponding Chinese Application No. 201680017674.X, dated Feb. 3, 2019.
(Continued)

*Primary Examiner* — Nguyen Q. Ha
(74) *Attorney, Agent, or Firm* — Bacon & Thomas, PLLC

(57) ABSTRACT

A versatilely usable pressure sensor is described, which has a ceramic pressure measuring cell (5) clamped in the pressure sensor with interpositioning of a seal (1) outwardly sealing an interior of the pressure sensor and loadable via an opening (3) of the pressure sensor with a pressure (p) to be measured, and whose seal (1) comprises a film (21) of a thermoplastic material, especially polytetrafluoroethylene (PTFE), clamped (in an axial direction and extending perpendicularly to planes of the sealing surfaces (25, 27)) between a form-retaining, planar sealing surface (25) of the pressure measuring cell (5) and a form-retaining sealing surface (27, 27') of a counterbody (19, 19') outwardly surrounding the opening (3), characterized in that the film (21) includes a first film segment (23), which is clamped between the sealing surface (25) of the pressure measuring cell (5) and the sealing surface (27, 27') of the counterbody (19), and the film (21) includes a second film segment (29), which extends over a lateral surface (31) of the counterbody (19, 19') different from the sealing surface (27, 27'), and which is connected with the counterbody (19, 19') on the (Continued)

lateral surface (31) via a connecting layer (33) of a material serving as bonding agent for the material of the film (21), especially perfluoroalkoxy-polymer (PFA), arranged on the lateral surface (31).

14 Claims, 2 Drawing Sheets

(56) References Cited

U.S. PATENT DOCUMENTS

| | | | |
|---|---|---|---|
| 5,869,766 A | | 2/1999 | Cucci et al. |
| 7,059,609 B1 | | 6/2006 | Locke et al. |
| 2017/0010169 A1 | * | 1/2017 | Hugel .................. G01L 9/025 |

FOREIGN PATENT DOCUMENTS

| | | |
|---|---|---|
| CN | 103032047 A | 4/2013 |
| CN | 104145144 A | 11/2014 |
| DE | 196 28 551 A1 | 2/1997 |
| DE | 103 34 854 A1 | 3/2005 |
| DE | 10 2004 057 967 A1 | 6/2006 |
| DE | 10 2013 111 910 A1 | 4/2015 |
| DE | 10 2015 104 365 A1 | 9/2016 |
| EP | 1 754 963 A1 | 2/2007 |
| EP | 1 887 599 A1 | 2/2008 |
| WO | 02/063263 A1 | 8/2002 |
| WO | 2005/012865 A1 | 2/2005 |
| WO | WO-2006058861 A1 * 6/2006 ........... G01L 9/0075 |

OTHER PUBLICATIONS

6erman Search Report, German PTO, Munich, dated Dec. 7, 2015.
International Search Report, EPO, The Netherlands, dated May 12, 2016.

* cited by examiner

PRESSURE SENSOR

TECHNICAL FIELD

The present invention relates to a pressure sensor, which has a ceramic pressure measuring cell clamped in the pressure sensor with interpositioning of a seal outwardly sealing an interior of the pressure sensor and loadable via an opening of the pressure sensor with a pressure to be measured, and whose seal comprises a film of a thermoplastic material, especially polytetrafluoroethylene (PTFE), clamped (in an axial direction extending perpendicularly to planes of the sealing surfaces) between a form-retaining, planar sealing surface of the pressure measuring cell and a form-retaining sealing surface of a counterbody outwardly surrounding the opening.

BACKGROUND

Pressure sensors are applied in pressure measuring technology for metrological registering of pressures. In such case, ceramic pressure measurement cells have an advantage that, due to the chemical and mechanical durability of ceramic, they can be exposed via an opening in the pressure sensor directly to a medium under a pressure to be registered metrologically. To this end, the pressure measurement cells are regularly clamped in the pressure sensor with interpositioning of a seal outwardly sealing an interior of the pressure sensor and supplied with the pressure to be registered via an opening of the pressure sensor.

Frequently applied as seals are elastomers. There are, however, applications, in the case of which elastomers cannot be applied, e.g. because they cannot withstand the arising chemical and thermal conditions. Metal seals often do not work, because of the required clamping forces.

In such cases, seals, especially flat seals, of chemically and/or thermally more resistant thermoplastics, such as e.g. polytetrafluoroethylene (PTFE), are used.

It is, however, difficult, to clamp the seals, on the one hand, sufficiently tightly, and, on the other hand, without degrading the accuracy of measurement of the pressure sensor to be sealed.

Described in DE 196 28 551 A1 is a pressure sensor with, arranged in a housing, a pressure measuring cell, in the case of which a PTFE seal is clamped between a resiliently formed sealing spring ridge of the housing of the pressure sensor and the pressure measuring cell, wherein the sealing spring ridge has a groove for accommodating the PTFE seal. The comparatively substantial seal has a thickness of 0.8 mm and is chambered, which is to prevent that the thermoplastic sealing material is squeezed too strongly by the compression between the sealing surfaces. In this case, however, comparatively large clamping forces are required, in order to achieve a reliable sealing. Large clamping forces can, however, degrade the accuracy of measurement of the pressure sensor, at least at low pressures, e.g. in the case of pressures below 1 bar. Moreover, hysteresis phenomena are to be expected in the case of the described sealing arrangement, since the elastic housing-side sealing surfaces must lead to shearing in the thermoplastic sealing material.

Both in DE 103 34 854 A1, as well as also in DE 10 2004 057 967 A1, a pressure sensor is described, which has a ceramic pressure measuring cell clamped in the pressure sensor with interpositioning of a seal outwardly sealing an interior of the pressure sensor and loadable via an opening of the pressure sensor with a pressure to be measured, and whose seal comprises a film of a thermoplastic material, especially polytetrafluoroethylene (PTFE), clamped (in an axial direction extending perpendicularly to planes of the sealing surfaces) between a form-retaining, planar sealing surface of the pressure measuring cell and a form-retaining sealing surface of a counterbody outwardly surrounding the opening.

Due to the clamping of the film formed in such case as a flat seal between two form-retaining sealing surfaces, a reliable sealing can be achieved with significantly smaller clamping forces.

In the case of both pressure sensors, the counterbody is embodied as a decoupling ring clamped between the pressure measuring cell and a shoulder of the housing surrounding the opening. The decoupling ring outwardly surrounds the opening, and protects the pressure measuring cell especially against stresses acting in the radial direction, thus perpendicular to the surface normal to the sealing surfaces. To this end, the decoupling ring is preferably composed of the ceramic of the pressure measuring cell.

In the case of the pressure sensor described in DE 103 34 854 A1, the counterbody is embodied as a ceramic ring, which has, protruding in the axial direction, formed through a number of annular, concentric ridges, structures, which, on the one hand, press the flat seal in, and, on the other hand, bring about in their intermediate spaces a kind of chambering for the sealing material.

In the case of the pressure sensor described in DE 10 2004 057 967 A1, the decoupling ring has in the axial direction a protrusion, whose planar end forms the sealing surface of the counterbody. In this way, the main closure of the flat seal clamped between the form-retaining, planar sealing surfaces is laterally exposed. The exposed clamping means that a movement or deformation the flat seal parallel to the planar sealing surfaces is not constrained by additional design elements, for instance, by a chambering.

This form of embodiment offers the advantage that defined compression of the seal can be achieved.

In the case of both pressure sensors, however, reproducible clamping of the flat seals proves to be difficult.

For overcoming the aforementioned disadvantages, the unpublished German patent application DE 10 2013 111 910.7 of the applicant, filed Oct. 29, 2013, describes a seal applied as a coating on a planar sealing surface of the counterbody. The coating includes a first layer serving as bonding agent applied directly on the sealing surface of the counterbody, e.g. a first layer of perfluoroalkoxy-polymer (PFA), on which a second layer of a thermoplastic material, e.g. polytetrafluoroethylene (PTFE), is applied. Both layers border on the opening of the pressure sensor, so that they are exposed in measurement operation to the medium supplied via the opening for metrologically registering its pressure.

There are, however, applications, in the case of which materials usable as bonding agent, especially due to their chemical properties, are not permitted to be directly contacted by the medium.

Moreover, the production of high value coatings, especially homogeneous and as pore free as possible coatings, is complex in comparison to the use of prefabricated, flat seals.

SUMMARY OF THE INVENTION

An object of the present invention, consequently, is to provide a versatilely applicable pressure sensor, which overcomes the disadvantages of the state of the art.

For this, the invention resides in a pressure sensor,
which has a ceramic pressure measuring cell clamped in the pressure sensor with interpositioning of a seal outwardly sealing an interior of the pressure sensor and loadable via an opening of the pressure sensor with a pressure to be measured, and
whose seal comprises a film of a thermoplastic material, especially polytetrafluoroethylene (PTFE), clamped (in an axial direction extending perpendicularly to planes of the sealing surfaces) between a form-retaining, planar sealing surface of the pressure measuring cell and a form-retaining sealing surface of a counterbody outwardly surrounding the opening,
characterized in that
the film includes a first film segment, which is clamped between the sealing surface of the pressure measuring cell and the sealing surface of the counterbody, and
the film includes a second film segment,
which extends over a lateral surface of the counterbody different from the sealing surface, and
which is connected with the counterbody on the lateral surface via a connecting layer of a material serving as bonding agent for the material of the film, especially perfluoroalkoxy-polymer (PFA), arranged on the lateral surface.

A first further development is characterized in that the lateral surface of the counterbody is arranged offset from the sealing surface of the counterbody in a direction pointing away from the sealing surface of the pressure measuring cell by an offset, which is greater than or equal to a sum of a coating thickness of the connecting layer and a difference between a film thickness of the film in the unloaded state and the material thickness of the first film segment in the clamped state.

A preferred embodiment of the first further development is characterized in that
the counterbody has, adjoining the opening and extending in the direction of the pressure measuring cell, a protrusion,
whose end facing the pressure measuring cell forms the sealing surface of the counterbody, and
which has in the axial direction a height corresponding to the offset.

A second further development is characterized in that
the connecting layer is spaced in the radial direction from the sealing surface of the counterbody, and
the first film segment and the second film segment are connected by a region of the film connecting the two film segments with one another.

A third further development is characterized in that the lateral surface of the counterbody, as well as the connecting layer arranged thereon, are located in a region of the interior of the pressure sensor sealed from the opening.

A fourth further development is characterized in that the film has a film thickness, which is dimensioned in such a manner that the clamped first film segment has in the clamped state a material thickness of greater than or equal to 0.03 mm, especially greater than or equal to 0.06 mm and especially greater than or equal to 0.08 mm and less than or equal to 0.2 mm, especially less than or equal to 0.15 mm, especially less than or equal to 0.12 mm.

A fifth further development is characterized in that the connecting layer has a coating thickness in the order of magnitude of a number of micrometers.

A sixth further development is characterized in that
the counterbody is clamped between a stop facing the pressure measuring cell, especially a stop in the form of a housing shoulder outwardly surrounding the opening, and an outer edge of a pressure measuring cell end facing the stop,
another seal is provided between the counterbody and the shoulder for outwardly sealing the interior of the housing, and
the other seal comprises a film of a thermoplastic material, especially polytetrafluoroethylene (PTFE),
which comprises a first film segment, which is clamped (in the axial direction extending perpendicularly to planes of the sealing surfaces) between a form-retaining, planar sealing surface of the stop, especially the shoulder, and a form-retaining sealing surface of the counterbody outwardly surrounding the opening, and
which comprises a second film segment, which extends over a lateral surface of the counterbody different from the sealing surface of the counterbody and is connected with the counterbody via a connecting layer arranged on the lateral surface and composed of a material suitable as a bonding agent for the material of the film, especially a perfluoroalkoxy-polymer (PFA).

A preferred embodiment of the first and sixth further developments is characterized in that
the counterbody has on its end facing the stop an annular protrusion adjoining the opening and extending toward the stop, and
the protrusions have planar ends forming the sealing surfaces of the counterbody.

An embodiment of the sixth further development is characterized in that
the counterbody has on its end facing the stop an annular protrusion adjoining the opening and extending toward the stop and having structures, especially concentric ridges, protruding toward the stop,
the counterbody has on its end facing the pressure measuring cell an annular protrusion adjoining the opening, and extending in the direction of the pressure measuring cell and having structures, especially concentric ridges, protruding in the direction of the pressure measuring cell, and
the ends of the structures form the sealing surfaces of the counterbody.

A preferred embodiment is characterized in that the pressure measuring cell and the counterbody are clamped with an elastic prestress in the axial direction relative to one another.

A preferred embodiment of the sixth further development is characterized in that the seals, the lateral surfaces and the sealing surfaces of the counterbody are identically embodied on both ends of the counterbody and are arranged lying opposite one another.

Additionally, the invention resides in a method for manufacturing a pressure sensor of the invention, characterized in that the second film segments are laminated on their lateral surfaces of the counterbody with interpositioning of their connecting layers.

Additionally, the invention resides in a method for manufacturing a pressure sensor of the invention, characterized in that the first film segments of the seals are tempered in the clamped state at increased temperature, especially a temperature of not less than 80° C., especially not less than 100° C., especially not less than 150° C.

DESCRIPTION OF DRAWINGS

The invention and its advantages will now be explained in greater detail based on the figures of the drawing, in which two examples of embodiments are shown. Equal elements are provided in the figures with equal reference characters. The figures of the drawing show as follows:

FIG. 1 shows an example of an embodiment of a pressure sensor of the invention. FIG. 2 shows an enlarged representation of the detail encircled in FIG. 1. The pressure sensor comprises a ceramic pressure measuring cell 5 clamped in the pressure sensor with interpositioning of a seal 1 outwardly sealing an interior of the pressure sensor and loadable via an opening 3 of the pressure sensor with a pressure p to be measured.

DESCRIPTION OF PREFERRED EMBODIMENTS

Figure 1:
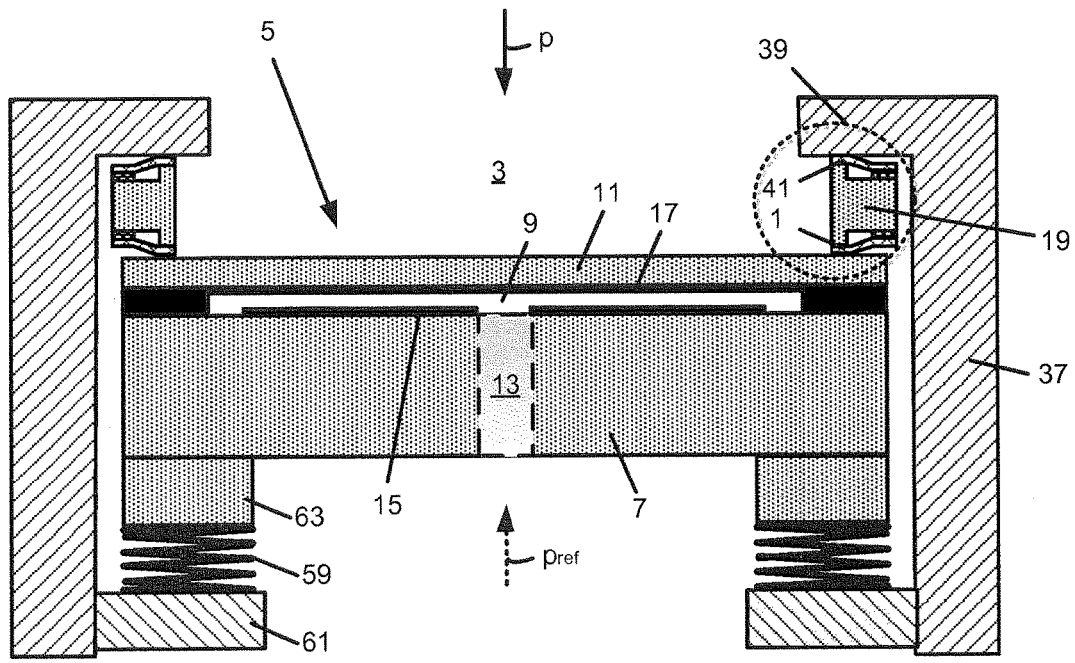
FIG. 1 a pressure sensor of the invention.

The pressure measuring cell 5 includes in the illustrated example of an embodiment a ceramic platform 7 and a ceramic measuring membrane 11 applied thereon and enclosing a pressure chamber 9. It can, for example, be embodied as an absolute pressure measuring cell, in which case the pressure chamber 9 enclosed with the measuring membrane 11 is evacuated. Alternatively, it can be embodied as a relative pressure measuring cell, in which case the pressure chamber 9 is fed a reference pressure $p_{ref}$, e.g. an ambient pressure, via a pressure supply line 13 (here shown dashed as an option) extending through the platform 7.

A pressure p supplied via the opening 3 and acting on the measuring membrane 11 effects a pressure-dependent deflection of the measuring membrane 11, which is registered by means of an electromechanical transducer and converted into an electrical, primary signal dependent on the pressure p metrologically to be registered. Suited as transducer is e.g. a capacitive transducer, which comprises an electrode 15 applied 2-dimensionally on a surface of the platform 7 facing the measuring membrane 11 and a counterelectrode 17 applied 2-dimensionally on an inner side of the measuring membrane 11 facing the platform 7. Electrode 15 and counterelectrode 17 form together a capacitor with a capacitance dependent on the pressure dependent deflection of the measuring membrane 11 and metrologically registered by means of a measurement circuit (not shown), and converted into a pressure dependent signal. Alternatively, other transducer principles can be applied for registering the pressure dependent deflection of the measuring membrane 11.

In order to clamp the pressure measuring cell 5, a clamping apparatus is provided, by which the pressure measuring cell 5 and a counterbody 19 outwardly surrounding the opening 3 of the pressure sensor are clamped together with an elastic prestress.

The seal 1 provided between pressure measuring cell 5 and counterbody 19 comprises a film 21 of a thermoplastic material, especially polytetrafluoroethylene (PTFE). This film 21 includes a first film segment 23, which is clamped between a form-retaining, planar sealing surface 25 of the pressure measuring cell 5 and a second form-retaining, planar sealing surface 27 of the counterbody 19 outwardly surrounding the opening 3, wherein the clamping is in the axial direction, extending perpendicularly to the planes of the sealing surfaces 25, 27.

In such case, a film thickness $d_{F0}$ of the film 21 is preferably dimensioned in such a manner that the clamped first film segment 23 in the clamped state has a material thickness $d_{EN}$ of greater than or equal to 0.03 mm, preferably greater than or equal to 0.06 mm and especially preferably greater than or equal to 0.08 mm and less than or equal to 0.2 mm, preferably less than or equal to 0.15 mm and especially preferably less than or equal to 0.12 mm.

According to the invention, the film 21 includes a second film segment 29, which extends over a lateral, preferably planar, surface 31 of the counterbody 19 different from the sealing surface 27 of the counterbody 19 and is connected there with the counterbody 19 via a connecting layer 33 arranged on the lateral surface 31 and composed of a material suitable as bonding agent for the material of the film 21. In such case, it is sufficient that the connecting layer 33 has a coating thickness sufficient for fulfillment of its function as bonding agent for affixing the film 21. For this, layer thicknesses in the order of magnitude of a number of micrometers are regularly sufficient. Since the second film segment 29 is solidly connected with the counterbody 19, also the first film segment 23 connected therewith is fixed in its spatial arrangement relative to the counterbody 19. This offers the advantage that film 21 and counterbody 19 can be applied in the pressure sensor as a composite in a single working step. In such case, the first film segment 23 effecting the sealing of the interior is automatically located in the right position on the sealing surface 27 of the counterbody 19, and, in contrast to flat seals installed in the state of the art, no longer has to be precisely oriented at this position and to be held actively in position for completion of the clamping procedure.

The lateral surface 31 is preferably arranged offset from the sealing surface 27 of the counterbody 19 in direction pointing away from the sealing surface 25 of the pressure measuring cell 5 by an offset h. The offset h is preferably greater than or equal to a sum of a coating thickness $d_c$ of the connecting layer 33 and a difference between the film thickness $d_{F0}$ in the unloaded state and the material thickness $d_{EN}$ of the film segment 23 in the clamped state; i.e. preferably $h \geq d_c + (d_{F0} - d_{ES})$.

The offset h is preferably produced by providing the counterbody 19 with an annular protrusion 35 extending in the axial direction toward the pressure measuring cell 5 on its inner edge adjoining the opening 3. Protrusion 35 has in the axial direction a height corresponding to the offset h. In such case, the planar end of the protrusion 35 facing the pressure measuring cell 5 forms the planar sealing surface 27 of the counterbody 19.

Preferably, the connecting layer 33 is arranged not only offset in the axial direction from the sealing surface 27, but also spaced in the radial direction from the sealing surface 27 of the counterbody 19 by a distance x. In such case, the height difference between the first film segment 21 and the second film segment 29 resulting from the offset h is spanned by a region of the film 21 extending in the radial direction over the distance x to connect the two film segments 21, 29 with one another. In contrast with the film segments 23, 29, this spanning region of the film 21 is, however, exposed on both sides. In this way, there arises a soft, essentially crease- and edge free transition, whereby unnecessary loadings of the film material are prevented.

The first film segment 23 is clamped such that this main closure is laterally exposed, wherein the sealing characteristics of the seal 1 are exclusively determined by the properties of the thermoplastic material of the first film segment 23 and changed neither by the connection of the second film segment 29 with the counterbody 19, nor by the properties of the connecting layer 33.

The composite of film 21 and counterbody 19 is preferably produced by laminating the second film segment 29 on the connecting layer 33 on the lateral surface 31. In such case, first of all, the connecting layer 33 is applied on the lateral surface 31 of the counterbody 19. This happens preferably, e.g. by placing an annular washer of the material of the connecting layer 33 on the lateral surface 31. Then, a preferably likewise annular washer shaped film of the material of the film 21 is placed on the arrangement of connecting layer 33 on counterbody 19, and the resulting total arrangement is clamped in a forming tool reproducing the offset h. In this way, the originally annular washer shaped film is brought into a shape corresponding to the form of the film 21. Preferably, the annular washer shaped film of the thermoplastic material of the film 21 has an inner radius, which is less than the inner radius of the sealing surface 27 of the counterbody 19. In this way, it is assured that the film clamped in the forming tool extends over the entire sealing surface 27 of the counterbody 19.

Then the arrangement is heated, at least in the region of the connecting layer 33 bearing the clamping pressure, to a laminating temperature, in the case of which the connecting layer 33 bonds with the second film segment 29 and the lateral surface 31. Then, in given cases, film material protruding beyond the inner edge of the sealing surface 27 is removed by cutting or punching, so that the resulting first film segment 23 ends flushly with the sealing surface 27.

The lateral surface 31 of the counterbody 19 as well as the connecting layer 33 arranged thereon are located in the pressure sensor preferably in a region of the interior of the pressure sensor sealed by the first film segment 23 from the opening 3. The connecting layer 33 is, thus, protected by the film segment 23 effecting the sealing from direct contact with the medium supplied to the pressure measuring cell 5 via the opening 3. The connecting layer 33 can, thus, also be a material, which is not permitted to be in contact with the medium, e.g. because it would contaminate the medium and/or would not be resistant to the medium. If the film 21 is of polytetrafluoroethylene (PTFE), then the connecting layer 33 is composed preferably of a material especially well suited as bonding agent for polytetrafluoroethylene (PTFE), such as, for example, a perfluoroalkoxy-polymer (PFA).

The pressure measuring cell 5 is preferably arranged in a housing 37. Housing 37 is composed, for example, of a metal, especially a stainless steel, and includes a radially inwardly extending shoulder 39, which outwardly surrounds the opening 3.

In such case, counterbody 19 is preferably embodied as a decoupling ring separated from the housing 37 and protecting the pressure measuring cell 5 against thermomechanical stresses related to the different coefficients of thermal expansion of the pressure measuring cell 5 and the housing 37, especially against stresses acting in the radial direction, i.e. perpendicular to the surface normal to the measuring membrane 11. For this, the counterbody 19 is embodied as a separate component, and is composed preferably of a material with a coefficient of thermal expansion, which preferably equals the coefficient of thermal expansion of the ceramic of the pressure measuring cell 5, or which is at least as close as possible to such, e.g. to that of the ceramic of the pressure measuring cell 5.

Counterbody 19 is clamped in the housing 37 in the axial direction between a stop, here formed by an inner side of the shoulder 39 facing the pressure measuring cell 5, and an outer edge of the face of the pressure measuring cell 5 facing the stop. Counterbody 19 outwardly surrounds the opening 3.

Provided between the counterbody 19 and the stop is another seal 41 outwardly sealing the interior of the housing 37. Also this seal 41 comprises preferably a film 43 of a thermoplastic material, especially polytetrafluoroethylene (PTFE), which has first and second film segments 45, 47. The first film segment 45 is clamped in the axial direction extending perpendicularly to planes of the sealing surfaces 49, 51 between a form-retaining, planar sealing surface 49 of the stop and a form-retaining, planar sealing surface 51 of the counterbody 19 outwardly surrounding the opening 3. The second film segment 47 extends over a lateral surface 53 of the counterbody 19 different from the sealing surface 49 of the counterbody 19, and is there connected with the counterbody 19 via a connecting layer 55 arranged on the lateral surface 53 and composed of a material suitable as bonding agent for the material of the film 43. Also this lateral surface 53 is preferably planar. Lateral surface 53 is also here preferably offset from the sealing surface 51 of the counterbody 19 in direction pointing away from the sealing surface 49 of the shoulder 39 by the above described offset h, and the connecting layer 55 provided thereon is preferably arranged spaced in the radial direction by the above described distance x from the sealing surface 51 of the counterbody 19. If the film 41 is of polytetrafluoroethylene (PTFE), then the connecting layer 55 is composed preferably of a material especially well suited as bonding agent for polytetrafluoroethylene (PTFE), such as, for example, a perfluoroalkoxy-polymer (PFA). The offset h is also here preferably produced by giving the counterbody 19 an annular protrusion 57 extending in the axial direction on its inner edge adjoining the opening 3. The planar end of protrusion 57 of the counterbody 19 facing the pressure measuring cell 5 forms the sealing surface 51.

The seals 1, 41, the lateral surfaces 31, 53 and the sealing surfaces 27, 51 on both ends of the counterbody 19 are preferably embodied identically and arranged lying opposite one another.

In such case, the counterbody 19 embodied as a decoupling ring effects that mechanical stresses and hysteresis phenomena occurring due to the different coefficients of thermal expansion of housing 37 and pressure measuring cell 5, and acting especially in the radial direction, are absorbed via the first film segment 45 of the seal 41 clamped between the stop and the sealing surface 51 of the counterbody 19 facing the stop, and, thus, have scarcely any effects on the pressure measuring cell 5.

In such case, the radial stiffness of the counterbody 19 required for the decoupling is preferably achieved via a corresponding wall thickness of a region of the counterbody 19 located between the two protrusions 35, 57 and formed here as a cylindrical tube section. To this end, the cylindrical tube section has preferably a wall thickness of not less than 0.5 mm, especially not less than 1 mm, and no more than 10 mm.

The axial dimension of the cylindrical tube section, thus its height H, is less critical. In given cases, it can even be advantageous to reduce the height H sufficiently that the decoupling ring can twist to some degree, in order to equalize, in given cases occurring, angle dependent irregularities of the measuring membrane 11 of the pressure measuring cell 5 or of the stop formed here by the shoulder 39 of the housing 37. In such case, the cylindrical tube section has in the axial direction preferably a height H, which amounts to not less than 0.25-times and preferably not less than half its breadth B and especially no more than 1.5 times and preferably no more than 0.8 times its breadth. In a currently preferred embodiment, the cylindrical tube section has a height between 10 mm and 0.1 mm.

The protrusions 35, 57 on the two ends of the cylindrical tube section have in the axial direction preferably a height corresponding to the offset h of one, or a few, tenths of millimeters, e.g. 0.2 mm, and in the radial direction a width of one of one, or a few, tenths of millimeters, e.g. 0.3 mm. The width of the protrusions 35, 57 corresponds to the radial width of the sealing surfaces 27, 51.

The cylindrical tube section and the protrusions 35, 57 adjoining thereon have preferably identical inner radii. Preferably, also the seals 1, 41 provided on both ends of the counterbody 19 have an inner radius, which essentially equals the inner radius of their adjoining protrusions 35, 57.

The pressure measuring cell 5, the counterbody 19 and the two seals 1, 41 are preferably clamped in the housing 37 with an elastic prestress. The elastic clamping serves to minimize fluctuations of the clamping force in the axial direction caused by the different coefficients of thermal expansion of pressure measuring cell 5 and housing 37. For producing the elastic prestress, e.g. a compression spring 59 can be applied, which is arranged on a rear-side of the pressure measuring cell 5 facing away from the shoulder 39 and clamped by means of a pressure ring 61 installed in the housing 37, e.g. screwed-in. In such case, there is provided between compression spring 59 and pressure measuring cell 5 preferably a stiff ring 63, which protects the pressure measuring cell 5 against stresses acting in the radial direction and resulting from the compression spring 59. Ring 63 is composed preferably of a material, which has a coefficient of thermal expansion, which is as close as possible to that of the ceramic of the pressure measuring cell 5. To this end, it is composed preferably of the ceramic of the pressure measuring cell 5.

Via the screw-in depth of the pressure ring 61, the degree of compression of the compression spring 59, and, thus, the axial clamping force in the total clamping chain extending from the ring 63 via the pressure measuring cell 5, the seal 1, the counterbody 19 and the seal 41 to the shoulder 39, is set.

Since the axial clamping force deforms the thermoplastic first film segments 23, 45, the manufacture of the pressure sensor of the inventions is preferably conducted in such a manner that the seals 1, 41 on both ends of the counterbody 19 are connected with the counterbody 19 via the connecting layers 33, 55, the counterbody 19 equipped with the seals 1, 41 is elastically clamped between the shoulder 39 and the pressure measuring cell 5, and the first film segments 23, 45 are tempered in the clamped state at increased temperature over a longer period of time, preferably over a number of hours. The tempering occurs preferably at a temperature of not less than 80° C., preferably not less than 100° C., and especially preferably not less than 150° C.

This effects that the clamped first film segments 23, 45 are axially compressed and flow, so that they in the end state assume the material thickness $d_{EN}$ in the clamped state. In this state, polytetrafluoroethylene (PTFE) is transparent, respectively translucent, and has excellent sealing characteristics. By enabling the clamped first film segments 23, 45 to flow, possibly present defects in the planar sealing surface 25 of the pressure measuring cell 5, the planar sealing surface 49 of the shoulder 39, and the planar sealing surfaces 27, 51 of the counterbody 19 are filled with the thermoplastic material of the first film segments 23, 45.

As regards the desired compressive pressures of the first film segments 23, 45 of the two seals 1, 41, reference is made to the above mentioned Offenlegungsschrift DE 10 2004 057 967 A1. The compressive pressures set forth there for flat seals hold here correspondingly for the first film segments 23, 45.

In the case of a pressure loadable diameter of the measuring membrane of 20 mm and an overload strength of 0.4 MPa, the clamping force can be, for example, 0.2 kN. When an overload strength of 6 MPa is desired, an axial clamping force of, for example, 2.5 kN is appropriate.

Figure 2:
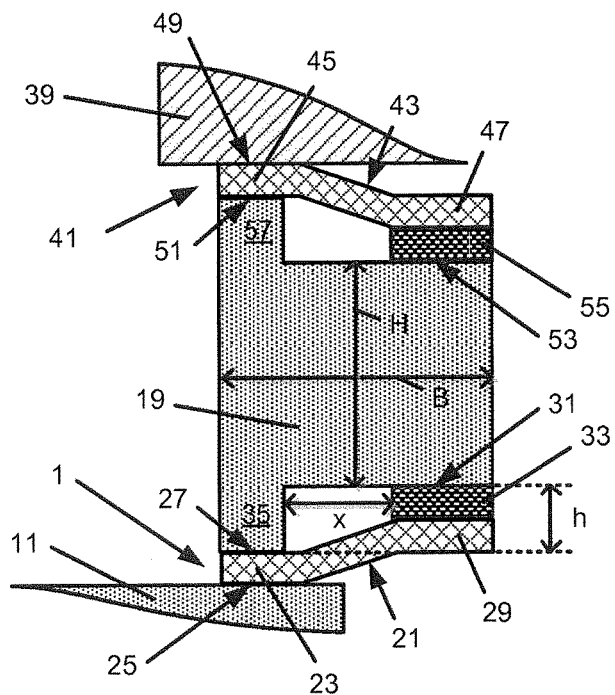
FIG. 2 a section of the pressure sensor of FIG. 1 encircled in FIG. 1.
Figure 3:
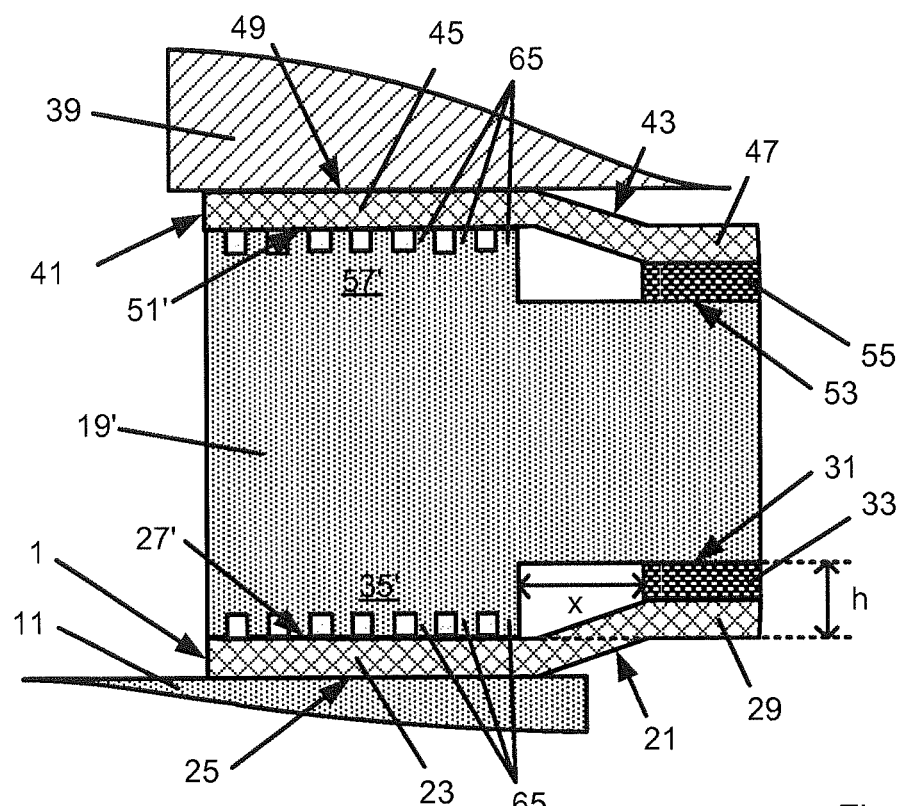
FIG. 3 a counterbody with structures protruding in the axial direction.

The invention is analogously applicable also in connection with the seal geometry described in DE 103 34 854 A1, in the case of which the pressure measuring cell is clamped by means of an elastic prestress against a counterbody, which has on its sealing surface facing the pressure measuring cell structures protruding in the direction of the pressure measuring cell. FIG. 3 shows, for this, a corresponding variation of the detail of the pressure sensor of FIG. 1 illustrated in FIG. 2, which is applicable in the otherwise equally-constructed pressure sensor illustrated in FIG. 1 instead of the detail illustrated in FIG. 2. The variation shown in FIG. 3 differs from the example of an embodiment illustrated in FIGS. 1 and 2 in the respect that the protrusions 35', 57' have in the radial direction a significantly greater width than the protrusions 35, 57 illustrated in FIGS. 1 and 2. Additionally, the protrusion 35' facing the pressure measuring cell 5 has structures 65 protruding in the direction of the pressure measuring cell 5, and the protrusion 57' facing the shoulder 39 forming the stop has structures 65 protruding in the direction of the shoulder 39. The structures 65 are e.g. concentric ridges protruding in the axial direction. In the case of this form of embodiment, the form-retaining, preferably planar, ends of the structures 65 form the sealing surfaces 27', 51' of the counterbody 19'. Apart from the dimensions of the counterbody 19' and the structures 65 protruding in the axial direction, the two examples of embodiments are the same, so that, otherwise, reference is made to the description to FIGS. 1 and 2. In such case, the above set forth dimensional specifications for the offset h between the sealing surfaces 27', 51' of the counterbody 19' and the lateral surfaces 31, 53 as well as for the distance x between the projections 35', 57' and the connecting layers 33, 55 hold correspondingly.

LIST OF REFERENCE CHARACTERS 1 seal
3 opening
5 pressure measuring cell
7 platform
9 pressure chamber
11 measuring membrane
13 pressure supply line
15 electrode
17 counterelectrode
19, 19' counterbody
21 film
23 film segment
25 sealing surface of the pressure measuring cell
27, 27' sealing surface of the counterbody
29 film segment
31 lateral surface
33 connecting layer
35, 35' protrusion
37 housing
39 shoulder
41 seal
43 film
45 film segment 47 film segment
49 sealing surface
51, 51' sealing surface
53 lateral surface
55 connecting layer
57, 57' protrusion
59 compression spring
61 pressure ring
63 ring
65 protruding structure

The invention claimed is:

1. Pressure sensor,
which has a ceramic pressure measuring cell (5) clamped in the pressure sensor with interpositioning of a seal (1) outwardly sealing an interior of the pressure sensor and loadable via an opening (3) of the pressure sensor with a pressure (p) to be measured, and
whose seal (1) comprises a film (21) of a thermoplastic material, especially polytetrafluoroethylene (PTFE), clamped (in an axial direction extending perpendicularly to planes of the sealing surfaces (25, 27)) between a form-retaining, planar sealing surface (25) of the pressure measuring cell (5) and a form-retaining sealing surface (27, 27') of a counterbody (19, 19') outwardly surrounding the opening (3), characterized in that
the film (21) includes a first film segment (23), which is clamped between the sealing surface (25) of the pressure measuring cell (5) and the sealing surface (27, 27') of the counterbody (19, 19'), and
the film (21) includes a second film segment (29),
which extends over a lateral surface (31) of the counterbody (19, 19') different from the sealing surface (27, 27'), and
which is connected with the counterbody (19, 19') on the lateral surface (31) via a connecting layer (33) of a material serving as bonding agent for the material of the film (21), especially perfluoroalkoxy-polymer (PFA), arranged on the lateral surface (31).

2. Pressure sensor as claimed in claim 1, characterized in that the lateral surface (31) of the counterbody (19) is arranged offset from the sealing surface (27, 27') of the counterbody (19, 19') in a direction pointing away from the sealing surface (25) of the pressure measuring cell (5) by an offset (h), which is greater than or equal to a sum of a coating thickness (dc) of the connecting layer (33) and a difference between a film thickness (dF0) of the film (21) in the unloaded state and the material thickness (dES) of the first film segment (23) in the clamped state.

3. Pressure sensor as claimed in claim 2, characterized in that
the counterbody (19, 19') has, adjoining the opening (3) and extending in the direction of the pressure measuring cell (5), a protrusion (35, 35'),
whose end facing the pressure measuring cell (5) forms the sealing surface (27, 27') of the counterbody (19, 19'), and
which has in the axial direction a height corresponding to the offset (h).

4. Pressure sensor as claimed in claim 2, characterized in that
the counterbody (19) has on its end facing the stop an annular protrusion (57) adjoining the opening (3) and extending toward the stop, and
the protrusions (35, 57) have planar ends forming the sealing surfaces (27, 51) of the counterbody (19).

5. Pressure sensor as claimed in claim 1, characterized in that
the connecting layer (33) is spaced in the radial direction from the sealing surface (27, 27') of the counterbody (19, 19'), and
the first film segment (23) and the second film segment (29) are connected by a region of the film (21) connecting the two film segments (23, 29) with one another.

6. Pressure sensor as claimed in claim 1, characterized in that the lateral surface (31) of the counterbody (19, 19'), as well as the connecting layer (33) arranged thereon, are located in a region of the interior of the pressure sensor sealed from the opening (3).

7. Pressure sensor as claimed in claim 1, characterized in that the film (21) has a film thickness, which is dimensioned in such a manner that the clamped first film segment (23) has in the clamped state a material thickness of greater than or equal to 0.03 mm, especially greater than or equal to 0.06 mm and especially greater than or equal to 0.08 mm and less than or equal to 0.2 mm, especially less than or equal to 0.15 mm, especially less than or equal to 0.12 mm.

8. Pressure sensor as claimed in claim 1, characterized in that the connecting layer (33) has a coating thickness in the order of magnitude of a number of micrometers.

9. Pressure sensor as claimed in claim 1, characterized in that
the counterbody (19, 19') is clamped between a stop facing the pressure measuring cell (5), especially a stop in the form of a housing (37) shoulder (39) outwardly surrounding the opening (3), and an outer edge of a pressure measuring cell (5) end facing the stop,
another seal (41) is provided between the counterbody (19, 19') and the shoulder (39) for outwardly sealing the interior of the housing (37), and
the other seal (41) comprises a film (43) of a thermoplastic material, especially polytetrafluoroethylene (PTFE),
which comprises a first film segment (45), which is clamped (in the axial direction extending perpendicularly to planes of the sealing surfaces (49, 51, 51')) between a form-retaining, planar sealing surface (49) of the stop, especially the shoulder (39), and a form-retaining sealing surface (51, 51') of the counterbody (19, 19') outwardly surrounding the opening (3), and
which comprises a second film segment (47), which extends over a lateral surface (53) of the counterbody (19, 19') different from the sealing surface (51, 51') of the counterbody (19, 19') and is connected with the counterbody (19, 19') via a connecting layer (55) arranged on the lateral surface (53) and composed of a material suitable as a bonding agent for the material of the film (43), especially a perfluoroalkoxy-polymer (PFA).

10. Pressure sensor as claimed in claim 8, characterized in that
the counterbody (19') has on its end facing the stop an annular protrusion (57') adjoining the opening (3) and extending toward the stop and having structures (65), especially concentric ridges, protruding toward the stop,
the counterbody (19') has on its end facing the pressure measuring cell (5) an annular protrusion (35') adjoining the opening (3) and extending in the direction of the pressure measuring cell (5) and having structures (65), especially concentric ridges, protruding in the direction of the pressure measuring cell (5), and the ends of the structures (65) form the sealing surfaces (27', 51') of the counterbody (19').

11. Pressure sensor as claimed in claim 9, characterized in that the seals (1, 41), the lateral surfaces (31, 53) and the sealing surfaces (27, 27', 51, 51') of the counterbody (19, 19') are identically embodied on both ends of the counterbody (19, 19') and are arranged lying opposite one another.

12. Pressure sensor as claimed in claim 1, characterized in that the pressure measuring cell (5) and the counterbody (19, 19') are clamped with an elastic prestress in the axial direction relative to one another.

13. Method for manufacturing a pressure sensor as claimed in claim 1, characterized in that the second film segments (29, 47) are laminated on their lateral surfaces (31, 53) of the counterbody (19, 19') with interpositioning of their connecting layers (33, 47).

14. Method for manufacturing a pressure sensor as claimed in claim 1, characterized in that the first film segments (23, 45) of the seals (1, 41) are tempered in the clamped state at increased temperature, especially a temperature of not less than 80° C., especially not less than 100° C., especially not less than 150° C.

* * * * *